(12) United States Patent
Endo et al.

(10) Patent No.: US 10,765,978 B2
(45) Date of Patent: Sep. 8, 2020

(54) FILTER

(71) Applicants: JNC CORPORATION, Tokyo (JP); JNC FILTER CO., LTD., Osaka (JP)

(72) Inventors: Daisuke Endo, Shiga (JP); Yozo Higuchi, Osaka (JP); Shinichi Tokudome, Shiga (JP); Kazuki Kanari, Shiga (JP)

(73) Assignees: JNC CORPORATION, Tokyo (JP); JNC FILTER CO., LTD., Osaka (JP)

( * ) Notice: Subject to any disclaimer, the term of this patent is extended or adjusted under 35 U.S.C. 154(b) by 60 days.

(21) Appl. No.: 15/573,484

(22) PCT Filed: May 15, 2015

(86) PCT No.: PCT/JP2015/064047
§ 371 (c)(1),
(2) Date: Nov. 13, 2017

(87) PCT Pub. No.: WO2016/185517
PCT Pub. Date: Nov. 24, 2016

(65) Prior Publication Data
US 2018/0085692 A1    Mar. 29, 2018

(51) Int. Cl.
*B01D 39/16* (2006.01)
*B01D 29/11* (2006.01)
(Continued)

(52) U.S. Cl.
CPC .............. *B01D 39/16* (2013.01); *B01D 29/11* (2013.01); *B32B 5/26* (2013.01); *D04H 1/4374* (2013.01);
(Continued)

(58) Field of Classification Search
CPC ............ B01D 39/16; B01D 2239/1233; B01D 2239/1216; B01D 29/11; D04H 1/593; D04H 1/4374; D04H 1/56; B32B 5/26
See application file for complete search history.

(56) References Cited

FOREIGN PATENT DOCUMENTS

| CN | 1167002 | 12/1997 |
|---|---|---|
| CN | 101674872 | 3/2010 |

(Continued)

OTHER PUBLICATIONS

"International Search Report (Form PCT/ISA/210) of PCT/JP2015/064047," dated Jun. 16, 2015, with English translation thereof, pp. 1-4.

(Continued)

*Primary Examiner* — Krishnan S Menon
*Assistant Examiner* — Waqaas Ali
(74) *Attorney, Agent, or Firm* — JCIPRNET

(57) ABSTRACT

Shown is a filter in which powder aggregation (bridge) is hard to occur, and a time until a rise of differential pressure is caused is long, more specifically, a filtration life is long. The filter has a base material layer, a filtration layer and a skin layer, in which the base material layer is a layer formed by a nonwoven fabric being wound in a multiple manner, and subjected to the thermocompression bonding, the filtration layer is a layer formed by a laminate prepared by laminating at least a through-air nonwoven fabric and a net, being wound in a multiple manner, and subjected to no thermocompression bonding, the skin layer is a layer including a nonwoven fabric, and a mean pore diameter of the nonwoven fabric composing the base material layer and the skin layer is larger than a mean pore diameter of the through-air nonwoven fabric composing the filtration layer.

9 Claims, 3 Drawing Sheets

(51) Int. Cl.
*D04H 1/4374* (2012.01)
*B32B 5/26* (2006.01)
*D04H 1/56* (2006.01)
*D04H 1/593* (2012.01)

(52) U.S. Cl.
CPC ............... *D04H 1/56* (2013.01); *D04H 1/593* (2013.01); *B01D 2239/1216* (2013.01); *B01D 2239/1233* (2013.01)

(56) References Cited

FOREIGN PATENT DOCUMENTS

| | | |
|---|---|---|
| CN | 102264968 | 11/2011 |
| CN | 102753245 | 10/2012 |
| CN | 104107587 | 10/2014 |
| JP | H04-099204 | 8/1992 |
| JP | 9029021 A * | 2/1997 |
| JP | H09-029021 | 2/1997 |
| JP | 2000-218113 | 8/2000 |
| JP | 2001-321620 | 11/2001 |
| JP | 2001-327815 | 11/2001 |
| JP | 2001327815 A * | 11/2001 |
| JP | 2010-137121 | 6/2010 |
| JP | 2015-097979 | 5/2015 |
| WO | 9813123 | 4/1998 |
| WO | 2015046564 | 4/2015 |

OTHER PUBLICATIONS

"Search Report of Europe Counterpart Application", dated Dec. 12, 2018, p. 1-p. 5.
Office Action of Taiwan Counterpart Application, with English translation thereof, dated Sep. 6, 2018, pp. 1-11.
Office Action of Taiwan Counterpart Application, with English translation thereof, dated Jul. 8, 2019, pp. 1-12.
Office Action of China Counterpart Application, with English translation thereof, dated Jul. 3, 2019, pp. 1-18.
Office Action of China Counterpart Application, with English translation thereof, dated Feb. 21, 2020, pp. 1-12.

* cited by examiner

FILTER

CROSS-REFERENCE TO RELATED APPLICATION

This application is a 371 application of the international PCT application serial no. PCT/JP2015/064047, filed on May 15, 2015. The entirety of the abovementioned patent application is hereby incorporated by reference herein and made a part of this specification.

TECHNICAL FIELD

The invention relates to a filter for filtering slurry and a gel-form fluent material containing a solids content.

BACKGROUND ART

In general, a filter has been used for filtration and purification of a fluid having a low concentration of a solids content and high flowability in the fluid containing powder fine particles.

One indication of filter performance is a filtration life representing duration during which the filter can be used and a cumulative flow. As an attempt for improving the filtration life, for example, a material prepared by providing at least two layers of a prefiltration layer and a microfiltration layer within a filter composed of a nonwoven fiber aggregate, in which the prefiltration layer is configured to be thinned in a fiber diameter of constituent fibers in a filtration direction, and the microfiltration layer is composed of the nonwoven fiber aggregate containing fibers finer than a minimum fiber diameter in the prefiltration layer (Patent literature No. 1).

However, in order to configure the prefiltration layer to be thinned in the fiber diameter in the filtration direction, the nonwoven fiber aggregate in which a mean fiber diameter is changed in a length direction has been required to be arranged in advance. In order to produce such a nonwoven fiber aggregate, special spinning conditions should be set up, and therefore such production is disadvantageous in terms of cost. Moreover, the nonwoven fiber aggregate that can be produced has a limit in the minimum fiber diameter, and therefore such production has not been necessarily sufficient also in view of microfiltration performance.

Moreover, in order to obtain high precision filter having satisfactory form retention properties and an excellent balance between filter filtration precision and the filtration life, a proposal has been made on a nonwoven fabric for a filter, in which at least two layers of nonwoven fabrics are laminated, and a packing factor of the nonwoven fabric on an upper layer side is adjusted to 0.3 to 0.8, and a packing factor of the nonwoven fabric on a lower layer side is adjusted to 0.01 to 0.25 (Patent literature No. 2). In the relevant invention, a micro space is retained on a contact surface between a nonwoven fabric layer and a support material by arranging the nonwoven fabric having a low packing factor on the lower layer side of the filter, and utilization efficiency and the form retention properties of the filter are improved by acting the layer also as a cushioning material.

However, a filtration material to be targeted in the literature described above is an aqueous solution in which 0.6 µm alumina particles are dispersed thereinto with a concentration of 50 ppm, more specifically, the art is to filtrate a liquid containing the particles having a significantly small particle diameter and a low concentration.

Meanwhile, in order to shorten a drying time after filtration, to achieve volume reduction of the amount of condensation of a volatilized liquid, or the like, achievement of high concentration of the solids content has been required.

If the solids content is highly concentrated, the fluid results in poor flowability, and interaction of powders being the solids content to each other is strengthened. Therefore, in the case of a conventional cartridge filter for water, a problem has been known in which a rash phenomenon occurs when powder particles pass through the filter even with the powders having a diameter smaller than a mean pore diameter of the filter, powder aggregation (bridge) is caused, and an apparent particle diameter thereof is increased to cause clogging of the filter.

Patent literature No. 3 proposes a filter in which a problem of change in filtration precision by a differential pressure and shortening of a filter life in filtration of a viscous fluid is solved, and simultaneously even if a pulse pressure or a high differential pressure is caused, a soft gel-form solid can be caught. The invention of Patent literature No. 3 relates to an art in which a filter has, in a main filtration layer of the filter, a first main filtration layer subjected to compression bonding treatment to have a void ratio of 50 to 80%, and a second main filtration layer without being subjected to compression bonding treatment to have a void ratio of 80% or more, and a nonwoven fabric in the second main filtration layer is configured to be 1.2 times or more a nonwoven fabric in the first main filtration layer.

CITATION LIST

Patent Literature

Patent literature No. 1: WO 98/13123 A.
Patent literature No. 2: JP 2000-218113 A.
Patent literature No. 3: JP 2010-137121 A.

SUMMARY OF INVENTION

Technical Problem

As described above, various improvements have been made on filters. However, a filter has been required in which a filtration material with a higher concentration can be filtered, and a filtration life is longer.

More specifically, the invention is contemplated for providing a filter in which powder aggregation (bridge) is hard to occur, and a time until a rise of pressure-difference is caused is long, more specifically, a filtration life is long.

Solution to Problem

The present inventors have conceived, during studying a layer configuration of a laminate including a nonwoven fabric for a filtration layer, to control a configuration of a filter in a thickness direction (direction of a filtration material passing through the filter) in addition to a configuration of the nonwoven fabric for the filtration layer, such as a fiber diameter and a void ratio which have been so far taken into consideration. Then, the present inventors have found that powders contained in the filtration material can be dispersed thereinto by achieving coarseness of a fiber density of the nonwoven fabric for the filtration layer configuring the filter in the thickness direction, namely, by providing a moderate gap between laminated nonwoven fabrics, and formation of bridge is suppressed. Further, the present inventors have found that a suitable filtration layer can be prepared by a specific configuration, and a filter having suppressed occurrence of bridge, a long filtration life and also excellent classification performance can be obtained by controlling a pore diameter of other layers, and thus have completed the invention.

More specifically, the invention has structure described below.

Item 1. A filter, including a base material layer, a filtration layer and a skin layer, wherein the base material layer is a layer formed by a nonwoven fabric being wound in a multiple manner, and subjected to thermocompression bonding;

the filtration layer is a layer formed by a laminate prepared by laminating at least a through-air nonwoven fabric and a net, being wound in a multiple manner, and subjected to no thermocompression bonding;
the skin layer is a layer including a nonwoven fabric; and
a mean pore diameter of the nonwoven fabric composing the base material layer and the skin layer is larger than a mean pore diameter of the through-air nonwoven fabric composing the filtration layer.

Item 2. The filter according to item 1, wherein, in the laminate composing the filtration layer, a melt-blown nonwoven fabric, in addition to the through-air nonwoven fabric and the net, is laminated.

Item 3. The filter according to item 1 or 2, wherein the nonwoven fabric composing the base material layer is a melt-blown nonwoven fabric or a through-air nonwoven fabric each having air permeability in the range from 200 to 300 cc/cm$^2$/sec upon stacking 10 sheets.

Item 4. The filter according to any one of items 1 to 3, wherein the through-air nonwoven fabric composing the filtration layer is a through-air nonwoven fabric having a mean fiber diameter in the range from 0.1 to 200 μm.

Item 5. The filter according to any one of items 1 to 4, wherein the net has a mesh size thereof in the range from 1 to 5 mm, and a mean fiber diameter in the range from 50 to 300 μm.

Item 6. The filter according to any one of items 1 to 5, wherein, in the through-air nonwoven fabric composing the filtration layer, fibers are fused and/or bonded with each other at intersection points of the fibers in the through-air nonwoven fabric.

Item 7. A cylindrical filter, having the filter according to any one of items 1 to 6.

Advantageous Effects of Invention

The invention can provide a filter in which powder aggregation (bridge) is hard to occur even for a viscous fluid with a high concentration, and a time until a rise of differential pressure is caused is long, more specifically, a filtration life is long.

DESCRIPTION OF EMBODIMENTS

Figure 1:
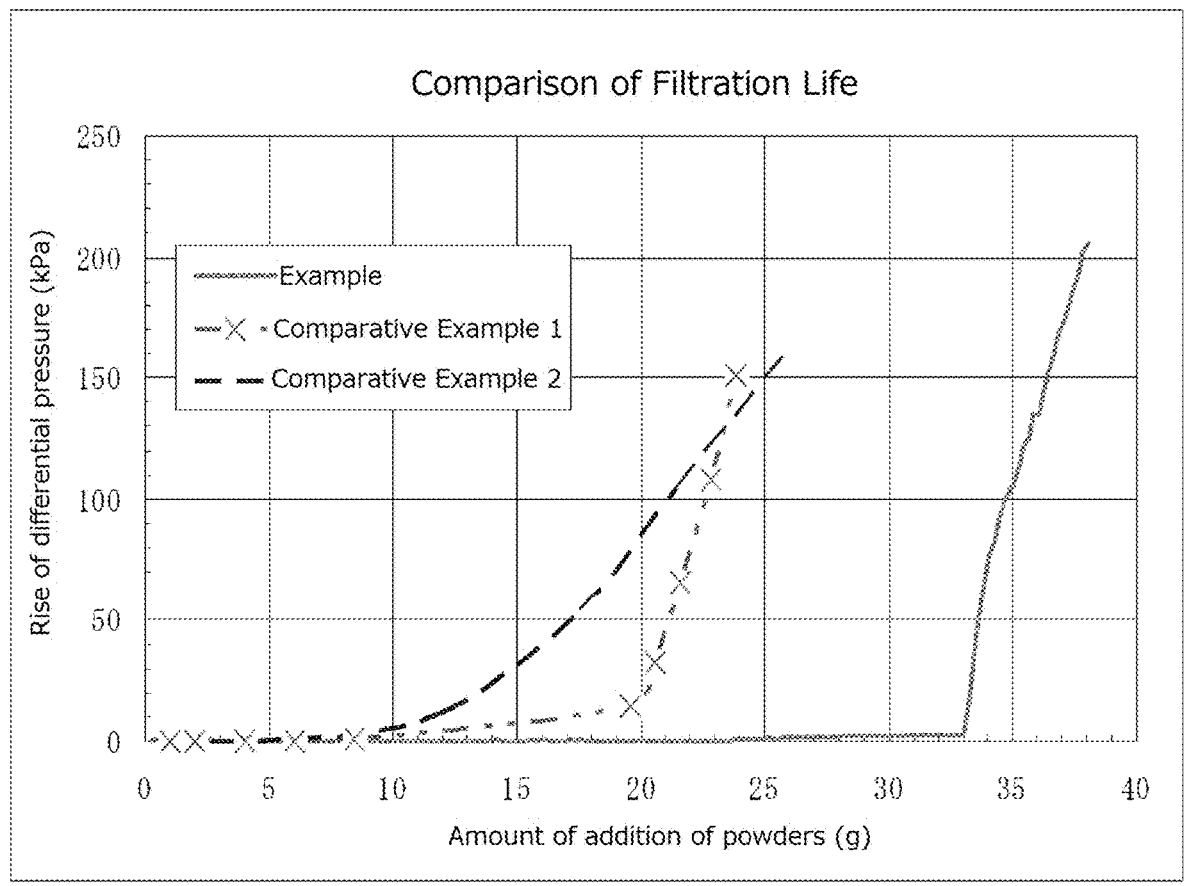
FIG. 1 is a graph showing test results in which a filtration life of a filter is compared between Example according to the invention and Comparative Example.

A filter of the invention has a base material layer, a filtration layer and a skin layer, in which the base material layer is a layer formed by a nonwoven fabric being wound in a multiple manner and subjected to thermocompression bonding; the filtration layer is a layer formed by a laminate prepared by laminating at least a through-air nonwoven fabric and a net, being wound in a multiple manner, and subjected to no thermocompression bonding; the skin layer is a layer including a nonwoven fabric; and a mean pore diameter of the nonwoven fabric composing the base material layer and the skin layer is larger than a mean pore diameter of the through-air nonwoven fabric composing the filtration layer.

As described above, the filtration layer of the filter according to the invention is the layer formed by the laminate prepared by laminating at least the through-air nonwoven fabric and the net, being wound, and subjected to no thermocompression bonding. The through-air nonwoven fabric has features of being bulky, and fiber orientation being distributed also in the thickness direction (direction of flow of the fluid to be filtered) of the nonwoven fabric. Therefore, pressure loss of the fluid is reduced, and even a viscous fluid with a high concentration can be filtered without staying thereon. Moreover, a proper gap is formed between the through-air nonwoven fabrics substantially having a filtration function by laminating the through-air nonwoven fabric and the net. Thus, flowability of the fluid and the powders in the fluid are improved in the filtration layer, and formation of bridge is suppressed. Thus, the filter having a long filtration life can be obtained. Moreover, the filter has a gap between the nonwoven fabrics. Thus, narrowing of a pore diameter or blocking of the pores by an overlapped layer of the nonwoven fabric is avoided, and therefore the filter is excellent also in capturing efficiency and filtration efficiency. Further, the layer is subjected to no thermocompression bonding. Thus, the gap between the nonwoven fabrics is retained, and simultaneously the nonwoven fabric can be slightly moved within the filtration layer, the flowability of the fluid and the powders in the fluid are further improved, and simultaneously a form of the filtration layer is retained by the net, and therefore the filtration performance is stably developed.

Nonwoven Fabric for Filtration Layer

As described above, the filtration layer is formed using the laminate prepared by laminating at least the through-air nonwoven fabric and the net. In the invention, the through-air nonwoven fabric means a nonwoven fabric obtained by a hot-air bonding process. The hot-air bonding process means a method for obtaining a nonwoven fabric having uniformity in the thickness direction by being equipped with a conveyor belt or a rotary drum in an oven, and passing a web therethrough, and then sucking the web in one side and improving a bonding effect, which is also referred to as a through-air system in another term.

In general, the hot-air bonding process has advantages such as 1) capability of producing a bulky nonwoven fabric, 2) capability of controlling a uniform temperature in a comparatively easy manner, and 3) capability of controlling shrinkage.

The best use of the advantages is made to pass crimpable short fibers through a carding machine into a web, apply hot-air treatment to the thus obtained web, and thermally melt the fibers in entangled points of the short fibers with each other, thereby obtaining the through-air nonwoven fabric. The mean pore diameter in the nonwoven fabric is kept constant by using the nonwoven fabric in which the fibers in the entangled points are thermally melted, and the filtration performance intrinsic thereto can be stably developed, and therefore stable performance as the filter can be maintained.

As the short fibers composing the through-air nonwoven fabric, the short fibers are preferably fused and/or bonded at the intersection points of the short fibers with each other in order to maintain the stable performance. Thus, thermo-fusible conjugate fibers can be preferably utilized as the short fibers. A king of the thermo-fusible conjugate fibers is not particularly limited, and publicly-known conjugate fibers can be used. As the thermo-fusible conjugate fibers, conjugate fibers composed of two or more kinds of components having a melting temperature difference can be used, and specific examples thereof include conjugate fibers composed of a high-melting point component and a low-melting point component. Specific examples of the high-melting point component in the conjugate fibers include a thermoplastic resin such as polypropylene (PP), polyethylene terephthalate (PET), polybutylene terephthalate, polytrimethylene terephthalate, nylon 6, nylon 6,6 and poly-L-lactic acid. Specific examples of the low-melting point component in the conjugate fibers include a thermoplastic resin such as polyethylene (PE) including low density polyethylene, linear low density polyethylene and high density polyethylene, a polyethylene terephthalate copolymer, poly-DL-lactic acid, a propylene copolymer and polypropylene. The melting point difference between the high-melting point component and the low-melting point component in the thermo-fusible conjugate fibers is not particularly limited. In order to extend a width of thermo-fusion processing temperature, the difference is preferably 15° C. or more, and further preferably 30° C. or more. Moreover, a form of conjugation is not particularly limited, and such a conjugation form can be applied as a concentric sheath-core type, an eccentric sheath-core type, a side-by-side type, a sea-island type and a radial type. In particular, an eccentric sheath-core type conjugate fibers are preferred for providing the fabrics with bulkiness.

Moreover, a cross sectional shape of the thermo-fusible conjugate fibers is not particularly limited, either. Any cross sectional shape may be applied, such as a circle, an elliptic, a triangle, a square, a U-shape, a boomerang shape, a profile such as an octafoil shape, and a hollow. Specific examples of the conjugate fibers include PE/PP conjugate fibers and PE/PET conjugate fibers. Moreover, according to characteristics and an intended purpose of the filtration material, specific fibers such as fluorocarbon fibers and glass fibers may be blended.

The thermo-fusible conjugate fibers to be used in the invention may contain a functional agent within the range in which advantageous effects of the invention are not adversely affected, and specific examples of the functional agent include an antibacterial agent, a deodorizing agent, an antistatic agent, a smoothing agent, a hydrophilic agent, a water-repelling agent, an antioxidant and a weathering agent. Moreover, in the thermo-fusible conjugate fibers, a surface thereof may be treated with a fiber finishing agent. The fibers can be provided with a function such as hydrophilicity, hydrophobicity, antielectricity, surface smoothness and wear resistance by the treatment.

The fibers composing the nonwoven fabric for the filtration layer have a fiber diameter preferably in the range from 0.1 to 200 µm, further preferably in the range from 1 to 180 µm, and most preferably in the range from 15 to 160 µm. The nonwoven fabric for the filtration layer obtained is excellent in bulkiness and cushioning properties by adjusting the fiber diameter to the range from 0.1 to 200 µm. When fibers having a fine fiber diameter is used, the capturing efficiency is improved, but the filtration life (life) tends to be shortened. Therefore, a balance between the filtration life and the capturing efficiency becomes particularly satisfactory by adjusting the fiber diameter to 15 to 160 µm.

The mean pore diameter of the nonwoven fabric for the filtration layer needs to be adjusted with the mean pore diameter of the nonwoven fabric for the base material layer and the net, but can be appropriately selected according to properties of a filtrate or an intended purpose of the filtration, and is ordinarily designed in combination with a particle diameter to be captured as an objective material. For example, when the particle diameter to be captured as the objective material is 50 µm, the mean pore diameter is preferably in the range from 40 to 60 µm, and further preferably in the range from 45 to 50 µm. Moreover, with regard to a limit of bridge formation, although a level depends on the powder particle diameter, designing so as to satisfy an expression: $De > 5 Dp$ in a relationship between the pore diameter (De) and the particle diameter (Dp) is generally deemed as a standard, and the mean pore diameter can be set based on the indication. The pore diameter is selected based on the expression described above, or according to physical properties of the particles having a large particle diameter to be desirably removed using the filter or a small particle diameter to be passed therethrough or the like, and the capturing efficiency to be required or the like.

A basis weight of the nonwoven fabric for the filtration layer is specified to some extent by a material of the fibers and the relationship between the fiber diameter and the mean pore diameter. The nonwoven fabric having a basis weight of 5 to 40 g/m², and further preferably 10 to 30 g/m² can be used, for example. If the basis weight is in the range from 5 to 40 g/m², a selection range for adjusting a thickness of the filtration layer and the mean pore diameter is extended, and therefore such a case is preferred.

Net

The net to be inserted into the filtration layer has no influence on the capturing efficiency of the filter, but is used in order to create the gap between the through-air nonwoven fabrics, retain the form of the filtration layer, and maintain and improve pressure resistance. Therefore, as the net, a monofilament having a fiber diameter in the range from 50 to 300 µm is preferably used, and a monofilament having a fiber diameter in the range from 60 to 280 µm is further preferably used. Further, a mesh size of the net is adjusted preferably in the range from 1 to 5 mm, and further preferably in the range from 1 to 4 mm. The capturing efficiency is not influenced, and strength of the filter can be secured by using the net in the range described above, and therefore the filter having a further longer filtration life can be obtained.

The monofilament is preferably composed of a thermoplastic resin, and single constituent fibers, conjugate fibers and blended fibers can be utilized. The thermoplastic resin that can be used for the monofilament is not particularly limited as long as the thermoplastic resin is melt-spinnable, but the thermoplastic resin as exemplified in the thermo-fusible conjugate fibers can be used, and a single thermoplastic resin or a mixture of two or more kinds of the thermoplastic resins may be used, for example. When the monofilament is conjugate fibers, for example, a combination of the thermoplastic resins as exemplified in the thermo-fusible conjugate fibers can be used. Specific example thereof include PE, PP, PET, nylon 6, nylon 6,6 and nylon 6,12, and PP or nylon is particularly preferred.

Composition of Filtration Layer

The filtration layer of the filter is formed by winding the laminate prepared by laminating at least the through-air nonwoven fabric and the net in a multiple manner. An order of lamination of the through-air nonwoven fabric and the net is not particularly restricted, but the through-air nonwoven fabric and the net is wound one by one, more specifically, the through-air nonwoven fabric and the net is preferably wound to be alternate one layer by one layer. The thus formed filtration layer is formed into a structure in which a coarse-textured net is interposed between the through-air nonwoven fabrics, and the through-air nonwoven fabrics are laminated with each other without being adhered.

Moreover, the laminate for the filtration layer is subjected to no thermocompression bonding, and the bulkiness of the through-air nonwoven fabric is retained, in which "subjected to no thermocompression bonding" means that the filtration layer as a whole is not in the form of being integrally hardened by the thermocompression bonding, and a part of the filtration layer may be subjected to thermocompression bonding for the purpose of improving the form retention properties of the filter. Moreover, a portion between the filtration layer and the base material layer, or between the filtration layer and the skin layer may be fused or bonded.

Moreover, when necessary, a further nonwoven fabric, net or the like may be laminated in addition to the through-air nonwoven fabric and the net. For example, a melt-blown nonwoven fabric having a texture coarser than the texture of the through-air nonwoven fabric is inserted thereinto in addition to the through-air nonwoven fabric and the net, and the resulting laminate having three layer structure is wound, and thus the retention properties and the capturing efficiency of the filtration layer can be improved. When the melt-blown nonwoven fabric is used, the melt-blown nonwoven fabric same with the fabric to be used in the base material layer or the skin layer can be preferably used.

The capturing efficiency is publicly-known by a log-penetrating expression to be controlled by the thickness of the filtration layer through which the fluid passes, and the thickness of the filtration layer (the number of winding the laminate) can be appropriately selected according to the capturing efficiency to be required. As the thickness of the filtration layer (the number of winding the laminate) is larger, the capturing efficiency is improved, and powders having a small particle diameter can be captured.

Nonwoven Fabric for Base Material Layer

The nonwoven fabric for the base material layer to be used in the invention may be any of the melt-blown nonwoven fabric or the through-air nonwoven fabric if the nonwoven fabric has air permeability in the range from 200 to 300 cc/cm$^2$/sec upon stacking 10 sheets. The nonwoven fabric having the air permeability in the range described above is preferred in view of low pressure loss.

When the melt-blown nonwoven fabric is used, a kind of ultrafine fibers composing the melt-blown nonwoven fabric, and a production method thereof are not particularly limited, and publicly-known ultrafine fibers and production method can be applied. For example, the melt-blown nonwoven fabric can be produced by melting and extruding a thermoplastic resin, spinning the resulting material from a melt-blown spinneret, and further blow-spinning the resulting material as a flow of ultrafine fibers by a high temperature and high speed gas, and collecting the ultrafine fibers as a web by a collecting apparatus, and applying heat treatment to the web obtained to allow thermal fusion of the ultrafine fibers with each other.

As the high temperature and high speed gas to be used in the melt-blown spinning, air or an inert gas such as a nitrogen gas is ordinarily used. A temperature of the gas in the range from 200 to 500° C. and a pressure in the range from 0.1 to 6.5 kgf/cm$^2$ are generally applied.

When the melt-blown nonwoven fabric is used as the nonwoven fabric for the base material layer, a mean fiber diameter thereof is preferably 1 to 100 μm, further preferably 6 to 60 μm, and most preferably 8 to 30 μm. If the mean fiber diameter of the melt-blown nonwoven fabric is 1 μm or more, productivity is satisfactory, mechanical strength of the ultrafine fibers composing the melt-blown nonwoven fabric is high, and single fiber breakage of the ultrafine fibers or break of the ultrafine fiber layer becomes hard to occur. Moreover, if the mean fiber diameter of the ultrafine fibers composing the melt-blown nonwoven fabric is 100 μm or less, original characteristics derived from smallness (fineness) of the fiber diameter of the ultrafine fibers can be sufficiently developed.

Moreover, as the melt-blown nonwoven fabric, a melt-blown nonwoven fabric composed of the single constituent fibers, a melt-blown nonwoven fabric composed of the conjugate fibers, a melt-blown nonwoven fabric composed of the blend fibers or the like can be utilized. Moreover, a resin that can be used for the melt-blown nonwoven fabric is not particularly limited as long as the resin is a melt-spinnable thermoplastic resin. For example, the thermoplastic resin as exemplified in the thermo-fusible conjugate fibers can be used, and a single thermoplastic resin, or a mixture of two or more kinds of thermoplastic resins may be used. Further, the thermoplastic resin may contain various functional agents within the range in which the advantageous effects of the invention are not adversely affected, and specific examples thereof include an antibacterial agent, a deodorizing agent, a hydrophilizing agent, a water-repelling agent and a surfactant. Moreover, the melt-blown nonwoven fabric may be subjected to secondary processing in order to provide the melt-blown nonwoven fabric with a function within the range in which an effect is not adversely affected, and specific examples thereof include coating treatment for hydrophillization or hydrophobilization, chemical treatment for introducing a specific functional group onto a surface of the ultrafine fibers composing the melt-blown nonwoven fabric and sterilization treatment.

Specific examples of the resin to be used for the nonwoven fabric for the base material layer include PE, PP, PET, nylon 6, nylon 6,6 and nylon 6,12. Moreover, when the through-air nonwoven fabric is used for the nonwoven fabric for the base material layer, a general through-air nonwoven fabric as exemplified in the nonwoven fabric for the filtration layer can be utilized.

A mean pore diameter of the nonwoven fabric for the base material layer can be appropriately selected according to the properties of the filtrate or the intended purpose of the filtration, but the nonwoven fabric having the mean pore diameter larger than the mean pore diameter of the through-air nonwoven fabric for the filtration layer is used. The mean pore diameter is ordinarily preferably adjusted to be in the range from 90 μm to 130 μm, and particularly preferably adjusted to be in the range from 100 μm to 120 μm. A basis weight of the nonwoven fabric for the base material layer is specified in some extent by a material of the fibers and the relationship between the fiber diameter and the mean pore diameter, but a nonwoven fabric having a basis weight of 5 to 50 g/m$^2$, further preferably 30 to 45 g/m$^2$ can be used, for example. If the nonwoven fabric has the basis weight in the range described above, such a basis weight is preferred from viewpoints of adjusting an outer diameter of the filter and adjusting a strength design of the base material layer.

The base material layer is a layer for mainly securing the strength of the filter, and preferably a layer in which the melt-blown nonwoven fabric is laminated, and the resulting material is united by thermocompression bonding. A thickness of the base material layer and the number of winding the nonwoven fabric are appropriately adjusted according to the melt-blown nonwoven fabric to be used, but are not particularly restricted as long as the strength of the filter is secured and predetermined filtration performance is obtained.

Skin Layer

The skin layer is a layer positioned on an outermost side (side upstream of the filtrate) of the filter, and is a layer having a main intended purpose particularly for blocking entry of an aggregated material having a large particle diameter and a foreign matter into the filtration layer, and also protecting the filtration layer, and retaining a filter form.

The skin layer is preferably a layer including a nonwoven fabric, and a layer composed of the nonwoven fabric. The nonwoven fabric to be used in the skin layer is not particularly restricted, but is preferably a nonwoven fabric having a mean pore diameter larger (coarser) than the mean pore diameter of the nonwoven fabric for the filtration layer.

A material of the nonwoven fabric is not particularly restricted, either. For example, the melt-blown nonwoven fabric similar to the material to be used in the base material layer is preferably used.

The number of winding or a thickness of the skin layer is not particularly restricted. If the number of winding the layer or the thickness is increased, however, poor performance of forming the bridge is caused in several cases in the skin layer before the filtrate reaches the filtration layer, and therefore the skin layer as thin as possible is preferably formed. For example, the skin layer is preferably formed by winding the fabric once to 5 times, preferably once to twice, and then being subjected to thermocompression bonding.

Production Method for Filter

The filter of the invention can be produced by winding the laminate while laminating the nonwoven fabric for the base material layer, the nonwoven fabric for the filtration layer and the net in the order. More specifically, the melt-blown nonwoven fabric being the nonwoven fabric for the base material layer is wound up around a cylindrical iron rod while the fabric is subjected to thermocompression bonding to form the base material layer serving as a core, for example. Subsequently, the through-air nonwoven fabric being the nonwoven fabric for the filtration layer and the net are sequentially inserted thereinto and wound therearound without being heated to form the filtration layer. Finally, the melt-blown nonwoven fabric is wound therearound once to twice, and subjected to thermocompression bonding to form the skin layer.

A temperature at which the base material layer is formed according to the method descried above may be at a level at which the nonwoven fabric is melted in a take-up portion (cylindrical iron rod) and subjected to compression bonding. Moreover, a production line speed is not particularly restricted, however, tension to be applied to the nonwoven fabric is preferably 10 N or less during formation of the filtration layer, and the laminate is preferably wound up therearound without applying the tension.

The filter to be produced as described above is cut into a suitable size and end caps are attached at both ends and the resulting materials is preferably used as a cylindrical filter.

Moreover, only an outline is described on the production method described above, and publicly-known steps such as heat treatment, cooling, chemical treatment, forming and cleaning can be performed, when necessary, in addition to the steps described above.

EXAMPLES

The invention will be described in greater detail by way of Examples below, but the invention is not restricted by Examples.

Methods of determining values of physical properties and definitions thereof indicated in Examples are as described below.

1) Method of Measuring a Mean Pore Diameter

A mean pore diameter was measured using Perm-Porometer CFP-1200-A made by PMI Corporation, according to a bubble point method (ASTM F316-86).

2) Method of Measuring Basis Weight

Weight of a nonwoven fabric cut into a size of 250 mm×250 mm was measured to determine weight per unit area ($g/m^2$), and the resulting value was taken as a basis weight.

3) Method of measuring air permeability

Measurement was carried out by using a Frajour type testing machine described in JIS L 1096.

EXAMPLE

Material

A polypropylene melt-blown nonwoven fabric having a basis weight of 42 $g/m^2$ and an air permeability of 280 $cc/cm^2/sec$ upon stacking 10 sheets was used as the nonwoven fabric for a base material layer.

A through-air nonwoven fabric composed of eccentric sheath-core type conjugate fibers made of polypropylene/polyethylene (mean fiber diameter: 31 μm), and having a basis weight of 30 $g/m^2$ and a mean pore diameter of 46 μm (stacking of 4 sheets) was used as the nonwoven fabric for a filtration layer.

A net composed of polypropylene monofilament (mean fiber diameter: 250 μm) and having a mesh size thereof of 2.0 mm was used as the net.

Production Method for a Filter

A middle core (iron rod) was heated to 215° C. in advance, and the melt-blown nonwoven fabric to be used for the base material layer was bonded to the middle core, and taken up therearound. On the above occasion, output of a take-up heater (heater nearest to a take-up part) was set to about 7.8 kW to heat the resulting material.

A total length of the melt-blown nonwoven fabric to be used for the base material layer was 8.6 m, and about 5.6 m thereof as the base material layer was heated with a heater output of 7.8 kW, and taken up while being thermally fused to prepare the base material layer.

After the melt-blown nonwoven fabric was taken up by 5.6 m, insertion of the through-air nonwoven fabric and the net each composing the filtration layer was subsequently started. A length of insertion was taken as 2 m, and the resulting material was taken up together with the melt-blown nonwoven fabric. On the above occasion, the resulting material by first 1 m was heated with the heater output of 7.8 kW to cause thermal fusion, and the resulting material by remaining 1 m was not heated by adjusting the heater output to 0 kW, and taken up without causing thermal fusion to compose the filtration layer. Subsequently, the resulting material was heated with the heater output of 7.8 kW, and as a skin layer, the melt-blown nonwoven fabric was taken up by 1 m while being thermally fused to produce a cylindrical filter.

Figure 3:
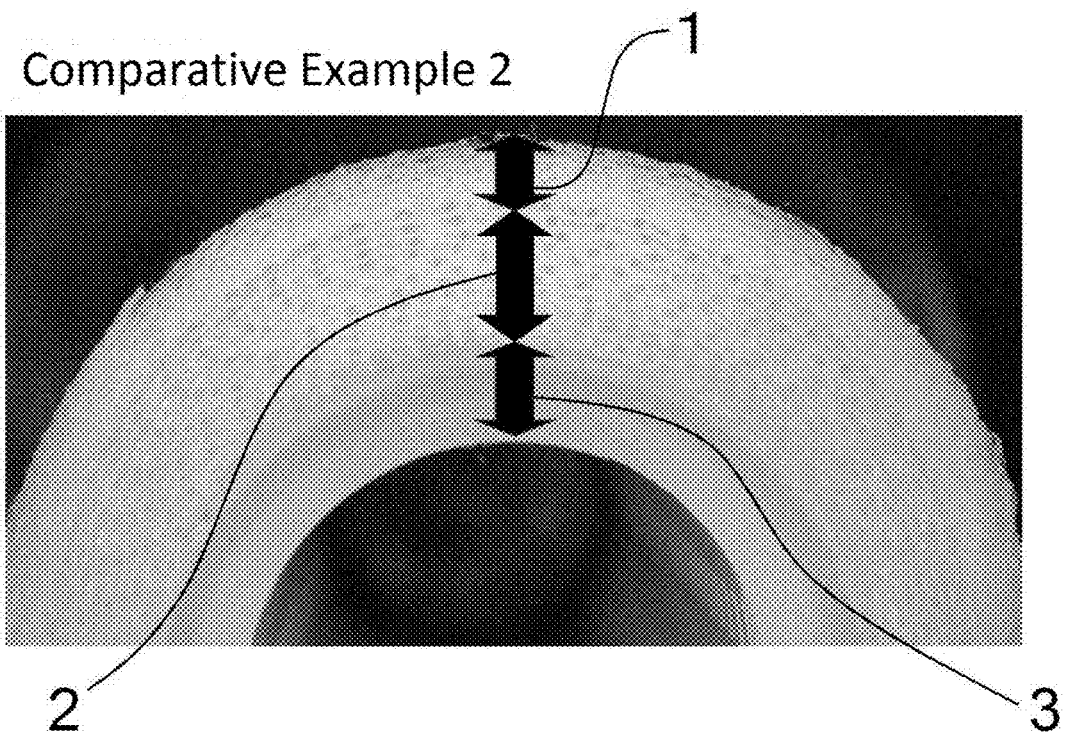
FIG. 3 is photographs showing cross sections of filters in Example (bottom) according to the invention and Comparative Example 2 (top).
Figure 3:
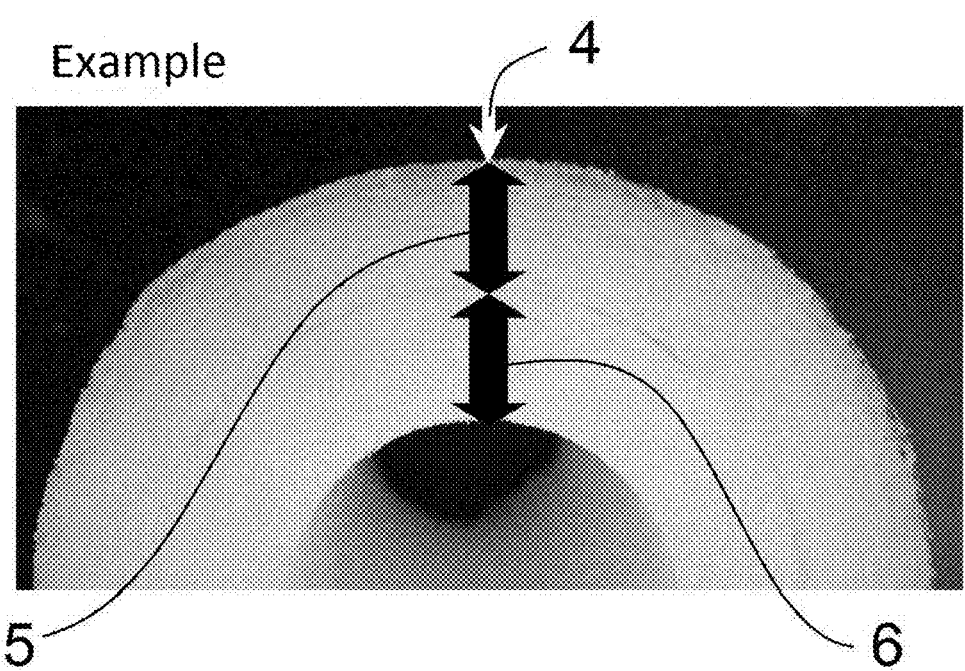

FIG. 3 (bottom) shows a photograph of a cross section of the filter in Example. FIG. 3 (bottom) shows skin layer 4 of the melt-blown nonwoven fabric, filtration layer 5 of the through-air nonwoven fabric and the net, and base material layer 6 of the thermally fused melt-blown nonwoven fabric.

Comparative Example 1

A cylindrical filter was produced in a manner similar to Example except that a through-air nonwoven fabric for a filtration layer was wound therearound while the nonwoven fabric is subjected to thermocompression bonding.

Comparative Example 2

Corresponding to a Conventional Product

Around a molded product core (porous cylinder having an outer diameter of 36 mm, a thickness of 3 mm, a length of 254 mm, made of polypropylene) molded by injection molding or the like, a melt-blown nonwoven fabric and a net serving as a base material were taken up, and in a process of production, a melt-blown nonwoven fabric having a basis weight smaller than the basis weight of the melt-blown nonwoven fabric being the base material was inserted thereinto. Then, only the melt-blown nonwoven fabric being the base material was taken up therearound. No thermocompression bonding was applied thereto.

FIG. 3 (top) shows a photograph of a cross section of the filter in Comparative Example 2. FIG. 3 (top) shows filtration layer 1 of the melt-blown nonwoven fabric, filtration layer 2 prepared by inserting the melt-blown nonwoven fabric into the melt-blown fabric and the net, and molded product core 3.

Performance Test

1. Filtration Life

With regard to the cylindrical filters in Example and Comparative Examples 1 and 2, a change of differential pressure behind and in front of a filter relative to a cumulative amount of addition of powders was measured for the powders and according to the method described below.

As test powders, seven kinds described in JIS Z 8901 "Test powders" were used.

The change of differential pressure behind and in front of the filter relative to the cumulative amount of addition of powders was followed by passing, through the filter, a test fluid prepared by adding the test powders into water in a circulation water amount of 30 L/min at a rate of 0.3 g/min (reference: Filter guide book for users, The Association of Liquid Filtration and Purification Industry in Japan).

The results are shown in FIG. 1.

As shown in FIG. 1, in the filter in Example, the cumulative amount of addition of powders until a rise of differential pressure is caused is significantly larger than the amount in Comparative Examples 1 and 2. The powders were added at a predetermined flow rate, and therefore the results show that the time until the rise of differential pressure is caused is long, more specifically, the filtration life is longer in the filter in Example than the life of the filters in Comparative Examples 1 and 2. In the filter in Example, a bulky through-air nonwoven fabric is used, and a proper gap is retained between the nonwoven fabrics without being subjected to thermocompression bonding. Thus, formation of bridge is conceivably suppressed, and the filter is conceivably excellent in the filtration life.

2. Capturing Efficiency

With regard to the cylindrical filters in Example and Comparative Examples 1 and 2, capturing efficiency was measured as initial capturing performance for test powders and according to the method described below.

As the test powders, seven kinds described in JIS Z 8901 "Test powders" were used.

The number of particles behind and in front of the filter relative to the cumulative amount of addition of powders was measured by passing, through the filter, a test fluid prepared by adding seven kinds of test powders according to JIS into water at a rate of 0.3 g/min (reference: Filter guide book for users, The Association of Liquid Filtration and Purification Industry in Japan).

The number of particles was measured using Particle Sensor (KS-63, made by Rion Co., Ltd.) and Particle Counter (KL-11, made by Rion Co., Ltd.).

The capturing efficiency was determined according to the definitional equation described below.

Capturing efficiency (%)=(1−(number of particles having particle diameter of $X$ μm after passing through filter/number of particles having particle diameter of $X$ μm before passing through filter))=100

Figure 2:
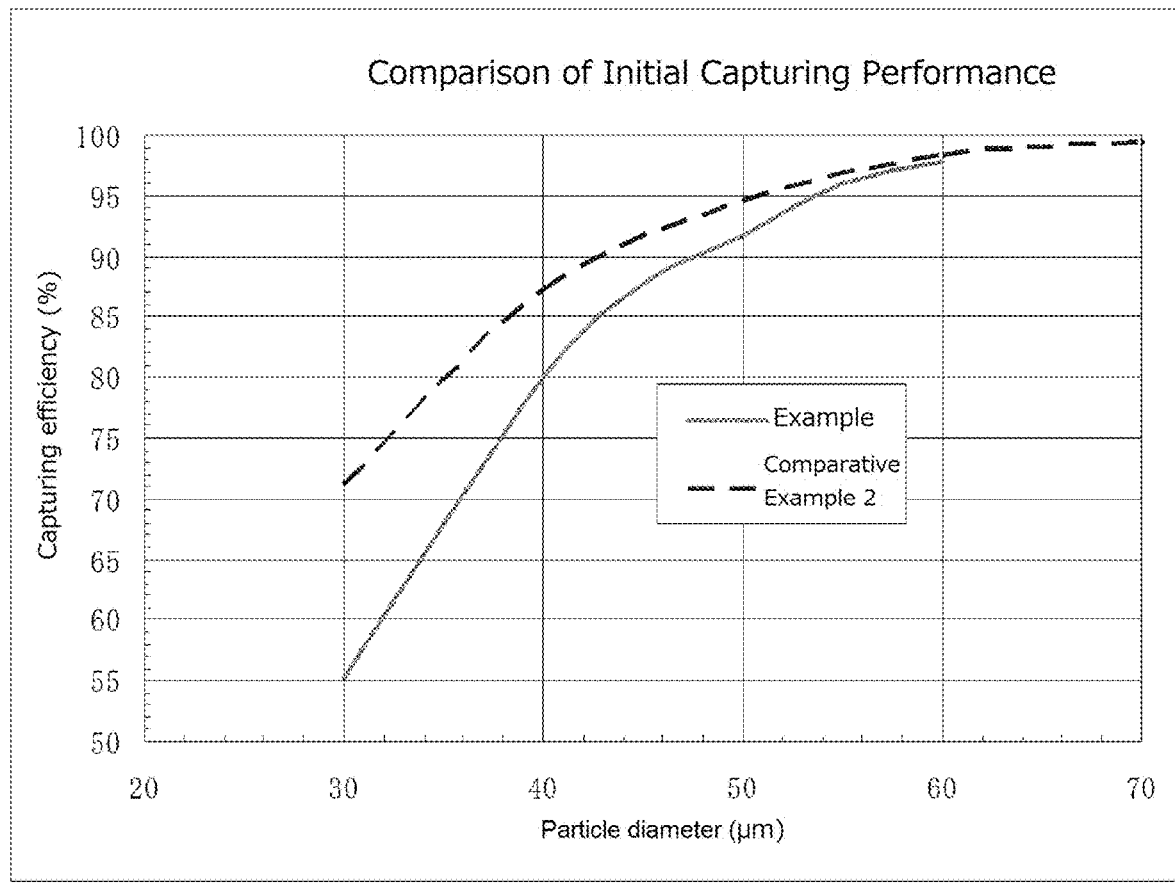
FIG. 2 is a graph showing test results in which initial capturing performance of a filter is compared between Example according to the invention and Comparative Example.

The results are shown in FIG. 2.

As shown in FIG. 2, in the filter in Example, the particles having a diameter of 50 μm or more were captured by 90% or more, and also the particles having a diameter of 30 μm were passed therethrough by substantially a half thereof. In contrast, in the filter in Comparative Example 2, the particles having the diameter of 50 μm or more were captured by 90% or more, but the particles having the diameter of 30 μm were captured by 70% thereof. The results described above show that the filter in Example has capability of capturing large particles to be removed, and meanwhile, reliably passing small particles to be passed therethrough, more specifically, is superior to the filter in Comparative Example 2 in classification performance.

INDUSTRIAL APPLICABILITY

In a filter of the invention, occurrence of powder aggregation (bridge) is suppressed, and therefore a filtration life is long, and the filter is also excellent in classification performance. The filter of the invention is preferably used as a filter used for obtaining fine particles having a predetermined particle size or less by removing an agglomerated material and a foreign matter from a suspension, slurry and a gel-form fluid each containing fine particles (powders) with a low concentration to a high concentration (10 ppm to 70%).

What is claimed is:

1. A filter, comprising a base material layer, a filtration layer and a skin layer,
   wherein the base material layer is a layer formed by a nonwoven fabric being wound in a multiple manner, and subjected to thermocompression bonding;
   the filtration layer is a laminate comprising at least a through-air nonwoven fabric and a net wound in a multiple manner and not thermocompression bonded together, and there is a gap between the through-air nonwoven fabric(s) in the filtration layer;
   the skin layer is a layer including a nonwoven fabric; and
   a mean pore diameter of the nonwoven fabric composing the base material layer and the skin layer is larger than a mean pore diameter of the through-air nonwoven fabric composing the filtration layer.

2. The filter according to claim 1, wherein, in the laminate composing the filtration layer, a melt-blown nonwoven fabric, in addition to the through-air nonwoven fabric and the net, is laminated.

3. The filter according to claim 1, wherein the nonwoven fabric composing the base material layer is a melt-blown nonwoven fabric or a through-air nonwoven fabric each having air permeability in the range from 200 to 300 cc/cm$^2$/sec upon stacking 10 sheets.

4. The filter according to claim 1, wherein the through-air nonwoven fabric composing the filtration layer is a through-air nonwoven fabric having a mean fiber diameter in the range from 0.1 to 200 μm.

5. The filter according to claim 1, wherein the net has a mesh size thereof in the range from 1 to 5 mm, and a mean fiber diameter in the range from 50 to 300 μm.

6. The filter according to claim 1, wherein, in the through-air nonwoven fabric composing the filtration layer, fibers are fused and/or bonded with each other at intersection points of the fibers in the through-air nonwoven fabric.

7. A cylindrical filter, comprising the filter according to claim 1.

8. The filter according to claim 1, wherein, the filtration layer is wound in the multiple manner in which the through-air nonwoven fabric and the net are wound in a layer-by-layer manner.

9. The filter according to claim 1, wherein, the through-air nonwoven fabrics and the net in the filtration layer are alternated disposed in a multiple manner.

* * * * *